US008711830B2

(12) United States Patent
Wason et al.

(10) Patent No.: US 8,711,830 B2
(45) Date of Patent: Apr. 29, 2014

(54) METHOD FOR MEDIA ACCESS CONTROLLING AND SYSTEM AND METHOD FOR CHANNEL TIME RESERVATION IN DISTRIBUTED WIRELESS PERSONAL AREA NETWORK

(75) Inventors: Prashant Wason, Bangalore (IN); Balaji Srinivas Holur, Bangalore (IN); Manoj Choudhary, Bangalore (IN); Sunil Dilipkumar Jogi, Bangalore (IN); Thenmozhi Arunan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 1991 days.

(21) Appl. No.: 11/266,235

(22) Filed: Nov. 4, 2005

(65) Prior Publication Data

US 2006/0198353 A1    Sep. 7, 2006

Related U.S. Application Data

(63) Continuation-in-part of application No. 11/122,216, filed on May 5, 2005.

(30) Foreign Application Priority Data

May 6, 2004   (IN) ............................. 418/CHE/2004
Dec. 30, 2004  (KR) ................................ 2004-116188

(51) Int. Cl.
*H04B 7/212*   (2006.01)
(52) U.S. Cl.
USPC ............ 370/347; 370/348; 370/447; 370/461
(58) Field of Classification Search
USPC .................................. 370/347, 348, 447, 461
See application file for complete search history.

(56) References Cited

U.S. PATENT DOCUMENTS

| | | | | |
|---|---|---|---|---|
| 2003/0012176 | A1* | 1/2003 | Kondylis et al. | 370/348 |
| 2003/0063619 | A1* | 4/2003 | Montano et al. | 370/443 |
| 2005/0169231 | A1* | 8/2005 | Bennett | 370/347 |
| 2005/0174953 | A1* | 8/2005 | Ho | 370/310 |
| 2005/0249170 | A1* | 11/2005 | Salokannel et al. | 370/338 |
| 2006/0056378 | A1* | 3/2006 | Sugaya | 370/347 |

FOREIGN PATENT DOCUMENTS

WO    2004023241 A2    3/2004

OTHER PUBLICATIONS

Yota Komoriya, Masaki Bandai, and Iwao Sasase, "A Medium Access Control Protocol with Deadlock Avoidance and Tolerance for Network Topology Changes in Wireless Ad-hoc Networks", Feb. 2002, vol. J-85-B, No. 12, pp. 2165-2178, w/English Thesis.
Bit, "Remote distance wireless communication standard, Bluetooth", Oct. 2000, vol. 32, No. 10, pp. 8-16, w/English Abstract.

* cited by examiner

*Primary Examiner* — Barry Taylor
(74) *Attorney, Agent, or Firm* — Sughrue Mion, PLLC

(57) ABSTRACT

Disclosed are a method for media access controlling and channel time reservation system and method in distributed wireless personal area networks. A method of media access controlling for a distributed wireless network including at least one device, includes a device of the distributed wireless network, generating a data slot reservation indicator for devices of the same beacon group, and the device, broadcasting the generated data slot reservation indicator. Thus, a slot reservation for communication between devices can be completed in a shorter period of time. Also, capacity of the network can be improved by spatial reuse of channel time.

17 Claims, 9 Drawing Sheets

FIG. 4
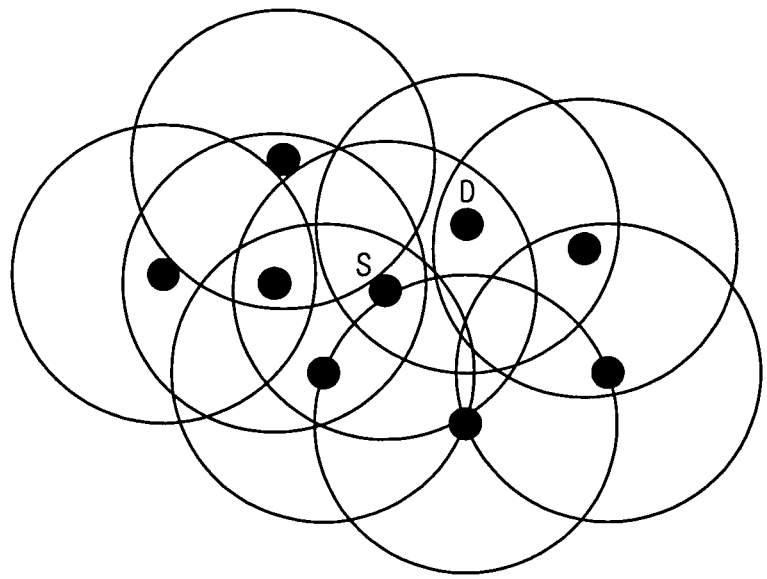
FIG. 5
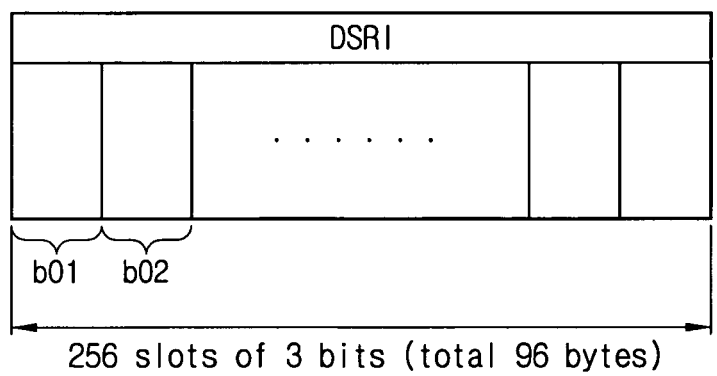
FIG. 6
| Bits : 1 | 1 | ... | 1 | 8 | 8 |
|---|---|---|---|---|---|
| | | | | Length (=32) | Element ID |
|←— 256 slots of 1 bits (total 32 bytes) —→|

FIG. 7

| Octet: 1 | 1 | 1 | 1 | L | 1 | 1 | 1 |
|---|---|---|---|---|---|---|---|
| STREAM ID | RANDOM NUMBER | PRIORITY | FORMAT | SLOT NUMBER | NUMBER OF OPTIONS | NUMBER OF SLOTS | DESTINATION ID |
| c08 | c07 | c06 | c05 | c04 | c03 | c02 | c01 |

FIG. 8

| Octet: 1 | 1 | 1 | 1 | L | 1 | 1 | 1 |
|---|---|---|---|---|---|---|---|
| STREAM ID | RANDOM NUMBER | PRIORITY | FORMAT | SLOT NUMBER | ALLOWED NUMBER OF SLOT | RESPONSE | DESTINATION ID |
| d08 | d07 | d06 | d05 | d04 | d03 | d02 | d01 |

FIG. 9

| Octet: 1 | 1 | 1 |
|---|---|---|
| STREAM ID | DESTINATION ID | FORMAT |
| e03 | e01 | e02 |

FIG. 10

| Octet: 1 | 1 | 1 |
|---|---|---|
| STREAM ID | DESTINATION ID | FORMAT |
| f02 | f01 | f03 |

METHOD FOR MEDIA ACCESS CONTROLLING AND SYSTEM AND METHOD FOR CHANNEL TIME RESERVATION IN DISTRIBUTED WIRELESS PERSONAL AREA NETWORK

CROSS-REFERENCE TO RELATED APPLICATIONS

This application is a continuation-in part of prior U.S. patent application Ser. No. 11/122,216, filed May 5, 2005, which claims benefit under 35 U.S.C. §119 from Indian Patent Application No. 418/CHE/2004 filed on May 6, 2004, and Korean Patent Application No. 2004-116188, filed on Dec. 30, 2004, the entire contents of which are incorporated herein by reference.

BACKGROUND OF THE INVENTION

1. Field of the Invention

The present invention relates to a system for and a method of making a channel time reservation as part of a media access control in a distributed wireless personal area network, which is based on a wireless mobile ad-hoc network.

2. Description of the Related Art

A wireless personal area network is defined as a network working within a personalized area of about 10 meters. IEEE (Institute of Electrical and Electronics Engineers) prescribes standards for such a wireless personal area network. An ultra wide band (UWB) communication technology can provide a transmission rate of over several hundreds mega bits per second (Mbps) in this personalized area. In such wireless personal area network, the wireless media is shared among all the devices for communication. Therefore, it requires a media access method for controlling the access to the media by the devices. In a broad sense of meaning, it includes how to access the network, how to transmit data to other devices at a desired transmission rate, and how to use the media optimally.

A media access control for the wireless personal area network can be designed in two access methods, i.e., a centralized access mode and a distributed access mode. In the centralized access, one of the devices acts as a coordinator for the whole network in order to manage and coordinate a media access for all the devices. All the devices request assistance from the centralized coordinator for a media access such as participation to the network or allocation of channel time. In the distributed access, the media access is uniformly distributed through all the devices of the network. In addition, all the devices share the burden of managing media access with each other.

FIG. 1 shows one example of a conventional wireless personal area network with centralized coordinator.

The network shown in FIG. 1 includes a centralized network called a 'piconet,' while supporting a centralized media access mode based on IEEE802.15.3. One device, which is called a PNC (Piconet Coordinator) operates as a coordinator in the piconet. A PNC, such as PNC 10 of FIG. 1, allows other devices to be connected to the network, and provides a function of allocation and synchronization of the channel (time slot), through which data is transmitted to other devices. This is an ad-hoc centralized wireless personal area network.

FIG. 2 shows a wireless personal area network having no centralized coordinator.

Referring to FIG. 2, a plurality of devices are included and marked by a dot. Circles made about each device indicate the communication range for each device.

The network of FIG. 2 supports a distributed media access control mode. Each device cooperates with the other devices, allows a new device to participate in the network, and shares information required for performing a media access control, such as channel time allocation and synchronization for transmitting data to other devices, and electric power saving. Therefore, no device in the network acts as a dedicated coordinator. This is a distributed ad-hoc WPAN system.

The distributed media access control mode relies on a timing concept called 'superframe.' The superframe has a fixed length in time, and is divided into a plurality of time windows called a 'time slot.' In addition, the time slot is also called a 'media access slot (MAS).' Some of the time slots are used for the devices to send a beacon. The remaining slots are used to send data. The slot where beacons are sent may be called a 'beacon slot' and the slot where data is sent may be called a 'data slot.' The length of a beacon period (BP) may be smaller than that of data period. The beacon slots may be distributed over the slots of a superframe, or they may appear together in the starting portion of a superframe. Furthermore, the number of beacons and beacon slots may be fixed and may vary.

FIG. 3 shows the structure of a conventional superframe.

The superframe structure shown in FIG. 3 is basically defined in the Multiband OFDM (Orthogonal Frequency Division Modulation) scheme. This includes 256 media access slots (including a11, a12, and a21). Some of the media access slots (including a11 and a12) constitute a beacon period a10, which is constructed of beacon slots. The remaining media access slots (including a21) form a data section a20 constituted of media access slots, which can be used by other devices of the network in order to transmit data to other devices in the network.

Each media access slot (including a11, a12, and a21) forms a superframe having a length of approximately 65 ms, and each media access slot (including a11, a12, and a21) is 256 μs.

Information of the superframe is broadcast within a beacon, which is broadcast by each device in the beacon period. Thus, neighbor devices of that device can use the information for a subsequent processing. The start time of a superframe is determined by the start-up of a beacon period, and defines a beacon period start time (BPST).

A device must find a free slot in the beacon slot in order to send a beacon. The device, which sends its own beacon periodically, is considered as part of the network. Furthermore, devices need a free data slot for communication with another device. In order to reserve such a data slot, a source device and a receiver device must know that a particular data slot is free. The reservation of data slot is carried out in a completely distributed manner in the devices, which share information and assist in the slot reservation with each other. Dissimilar to the centralized WPAN, it is noted here that none of the devices are operated as a central coordinator for various media access tasks.

Once a beacon slot is reserved, it is used by the device for sending a beacon as long as the device is part of the network. If required, a device may change the slot of sending beacon during its operation. On the contrary, data slots become free if devices stop using them. Such free data slots are added to a free data slot pool, and may be reserved for other devices. A device cannot reserve a slot already reserved by another device.

A conventional system cannot detect and solve a reservation conflict proactively, which may occur between two devices wanting to reserve a same data slot at the same time. Consequently, there is a need for an efficient and reliable method of performing a slot reservation in the distributed wireless personal area network.

SUMMARY OF THE INVENTION

Therefore, it is an object of the present invention to provide a channel time reservation system and method, which can make a slot reservation in a completely distributed manner in an ad-hoc ultrawide band WPAN having a distributed network topology.

In order to accomplish the above object, according to one aspect of the invention, there is provided a method of media access controlling for a distributed wireless network including at least one device, the method comprising: a device of the distributed wireless network, generating a data slot reservation indicator for devices of the same beacon group; and the device, broadcasting the generated data slot reservation indicator.

The data slot reservation indicator comprises a reservation status information regarding data slots of a super frame of the beacon group to which the one device belongs.

The super frame comprises 256 data slots, and the reservation status information indicates whether the 256 data slots are available for reservation or not.

The reservation status information of one data slot is expressed using '1' one bit, the reservation status information for the data slots available for reservation by the devices of the beacon group is expressed as '1', and the reservation status information for the data slots unavailable for reservation by the devices of the beacon group is expressed as '0'.

The data slot reservation indicator further comprises an ID information of the data slot reservation indicator, and a length information about the reservation status information of the data slots of the super frame.

The data slot reservation indicator information comprises 1 byte of the ID information, and 1 byte of the length information.

The data slot reservation indicator includes an information indicating the data slots available for reservation by the devices of the beacon group. The data slot reservation indicator includes an information indicating the data slots unavailable for reservation by the devices of the beacon group. According to another aspect of the present invention, there is provided a method of media access controlling in a distributed wireless network including at least one device, the method comprising: a device of the distributed wireless network, broadcasting a data slot reservation indicator of the devices of the same beacon group.

According to yet another aspect of the present invention, there is provided a method of media access controlling in a distributed wireless network including at least one device, the method comprising: all devices of the distributed wireless network, generating a data slot reservation indicator of the devices of the same beacon group; and the all devices, broadcasting the generated data slot reservation indicator simultaneously.

In order to accomplish the above object, according to one aspect of the invention, there is provided a method of reserving a channel time in a distributed wireless network including at least one device. The method of the invention comprises a step of making a source's reservation request to a destination device with respect to at least one common free slot, wherein the common free slot is not used within a source's beacon group to which the device belongs, and is a data slot having no data transmitter in a destination's beacon group which is a beacon group of the destination device within the source's beacon group, and a step of transmitting data after sending an acknowledgement in response to an acceptance response of the destination device to a reservation request for a slot, for which no reservation is processed within the destination's beacon group, during the source's reservation request for the common free slot.

An example of the distributed wireless network topology may be implemented for ultrawide band ad-hoc wireless personal area networks.

The method of the invention may further comprise a step of receiving a data slot reservation indicator, wherein at least one device within the distributed wireless network broadcasts a status of data slot of its own beacon group, and a step of determining at least one common free slot according to the data slot reservation indicator. The data slot reservation indicator represents availability of the data slots for the purpose of reservation in order to have data exchanges.

Preferably, but not necessarily, the data slot reservation indicator is updated by at least one device each corresponding to the status of data slot, either when a desired period comes or when having received a data slot reservation indicator, which is broadcast by at least one device.

The data slot reservation indicator is preferred to include status information of data slots of one superframe within a beacon group. The data slot reservation indicator can be broadcasted through the beacon of at least one device.

Preferably, but not necessarily, the status information indicates, from the viewpoint of the device broadcasting the data slot reservation indicator, a state where each of the data slots is either vacant and available to be used or unavailable. The unavailable state is either a state where at least one device in the neighborhood is acting as either a transmitter or a receiver of a unicast or multicast communication mode, or a state where either the transmitter or the receiver of the communication mode exists in the beacon group.

The data slot reservation indicator indicates the status information of each data slot, using at least one bit or more bits.

Preferably, but not necessarily, for a destination, the common free slot corresponds to either a slot vacant without communication in its beacon group or a slot where only a receiver of multicast communication mode exists in its beacon group. For a source, the common free slot corresponds to a slot vacant without communication in its beacon group.

In addition, if the reservation request is for a unicast communication, the common free slot is a slot vacant in the destination's beacon group without communication.

The response can reject the reservation request, in case where a reservation other than this reservation request is carried out by the destination for requested slots.

In addition, the acceptance response is sent for a higher priority request, decided in a certain desired manner, when multiple simultaneous requests received from different devices for the same common free slots.

Furthermore, the acceptance response is sent for a higher number, which is determined based on an arbitrary number contained in the reservation requests, even if the priorities of the received multiple simultaneous reservation requests are the same.

The method of the invention may further comprise a step of canceling of the reservation, in spite of an acceptance response from the destination device, when there is received a reservation request from another device with a higher priority for the same common free slot after the source's reservation request.

Preferably, but not necessarily, the destination device cancels the reservation request in spite of the acceptance response, when the device receives another acceptance response having a higher priority for the same common free slot.

In addition, the destination device may know about another acceptance response having the higher priority, through a data slot reservation indicator.

According to another aspect of the invention, there is provided a system for reserving a channel time in a distributed wireless network. The system of the invention comprises: a destination device, that receives a reservation request and sends an acceptance response to a reservation request for a slot, for which no reservation conflict exists due to reservations in the destination's beacon group during the reservation procedure; and a source device that sends the reservation request for at least one common free slot, and receives the acceptance response, and sends an acknowledgement for the acceptance response and transmits the data, wherein the common free slot is a slot that is not used by a transmitter or for communication in the destination's beacon group and is not used in the source's beacon group to which it belongs.

Preferably, but not necessarily, the distributed wireless network includes an ultra wide band ad-hoc wireless personal area networks.

Preferably, but not necessarily, the source device receives a data slot reservation indicator in which at least one device within the distributed wireless network broadcasts a status of data slot of its own beacon group, and determines at least one free slot according to the data slot reservation indicator.

Preferably, but not necessarily, the data slot reservation indicator is updated by at least one device each corresponding to the status of data slot, either when a desired period comes or when having received a data slot reservation indicator, which is broadcast by at least one device.

The data slot reservation indicator is preferred to include a status information on data slots of one superframe within a beacon group, to which the respective device broadcasting the data slot reservation indicator belongs. The data slot reservation indicator is broadcast through a beacon of at least one device.

Preferably, but not necessarily, the status information indicates, from the viewpoint of the device broadcasting the data slot reservation indicator, a state where each of the data slot is either vacant to be used or unavailable. The unavailable state is either a state where at least one device broadcasting the data slot reservation indicator corresponds to either a transmitter or a receiver of a unicast or multicast communication mode, or a state where either the transmitter or the receiver of the communication mode exists in the beacon group.

In addition, the data slot reservation indicator indicates the status information in every data slot, using at least one bit.

Preferably, but not necessarily, within the second beacon group, the common free slot corresponds to either a slot vacant without communication or a slot where only a receiver of multicast communication mode exists. Within the first beacon group, the common free slot corresponds to a slot vacant without communication.

In addition, if the first reservation request is for a unicast communication, the common free slot is a slot vacant within the second beacon group without communication.

Preferably, but not necessarily, the destination device may reject the first reservation request, in case where a reservation other than the first reservation request is carried out within the second beacon group with respect to at least one common free slot.

In addition, the counter device may make an acceptance response to a reservation request having a higher priority decided in a certain desired manner, when the counter device has received from a neighbor device within the second beacon group a separate reservation request other than the first reservation request, with respect to the common free slot.

Furthermore, the counter device may make an acceptance response to a single reservation request, based on an arbitrary number contained in the reservation requests, even if the separate reservation request has the same priority as that of the first reservation request.

Preferably, but not necessarily, the source device cancels a reservation with the counter device, in spite of an acceptance response of the counter device, when having received from other device within the first beacon group another reservation request having a higher priority with respect to the common free slot, after the first reservation request.

Furthermore, the counter device cancels the first reservation request in spite of the acknowledgement, when the counter device becomes aware, after the acceptance response, that another acceptance response having a higher priority with respect to the common free slot is made from other device within the second beacon group.

Preferably, the counter device becomes aware of the another acceptance response having the higher priority, through a data slot reservation indicator which is broadcast on a status of data slot in each beacon group by at least one device of the distributed wireless network. According to yet another aspect of the invention, there is provided a media access control method in a distributed wireless network including at least one device, the method comprising receiving, at a source device, a data slot reservation indicator from a beacon group of the source device, and broadcasting a data slot reservation indicator to the beacon group of the source device, and determining at least one common free slot based on the data slot reservation indicator, wherein the common free slot is not used within the beacon group of the source device and is a data slot having no data transmitter in a beacon group of a destination device.

The media access control method may further comprise a step of broadcasting the data slot reservation indicator updated corresponding to the status of the data slot, either when the data slot reservation indicator is being broadcasted, received or at a certain desired interval.

Preferably, but not necessarily, the data slot reservation indicator includes status information on 256 slots of one superframe, and the data slot reservation indicator is broadcasted through a beacon of at least one device.

Preferably, but not necessarily, the status information indicates a state of the data slot as either vacant and can be used or unavailable, from the view point of the device, which is broadcasting the data slot reservation indicator.

Preferably, but not necessarily, the data slot reservation indicator includes the status information of the 256 slots, and the status information is constituted of at least one bit.

BRIEF DESCRIPTION OF THE DRAWINGS

The above aspects and features of the present invention will be more apparent by describing certain embodiments of the present invention with reference to the accompanying drawings, in which:

FIG. 4 illustrates a network including a channel time reservation system in a distributed wireless personal area network according to one embodiment of the invention;

FIG. 5 shows one example of a data slot reservation indicator according to the invention;

FIG. 6 shows a data slot reservation indicator including one-bit unit status information according to the invention;

FIG. 7 illustrates one example of a data slot request information element according to the invention;

FIG. 8 shows one example of a data slot response information element according to the invention;

FIG. 9 shows one example of a data slot acknowledge information element according to the invention;

FIG. 10 shows one example of a data slot negative acknowledge information element according to the invention;

DETAILED DESCRIPTION OF EXEMPLARY EMBODIMENTS

Figure 1:
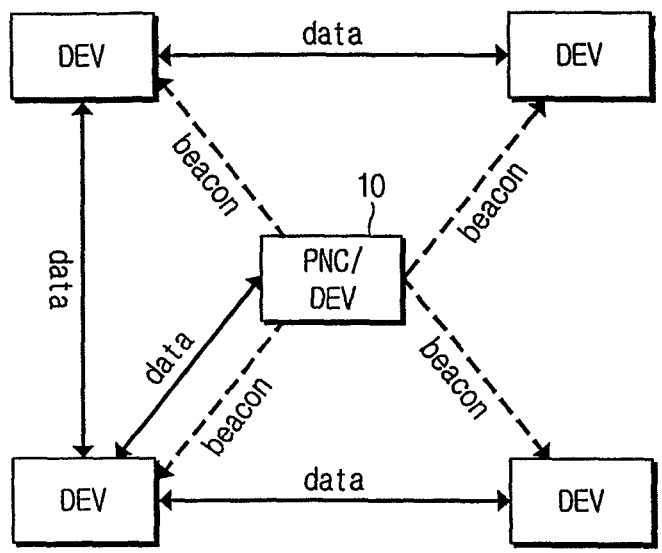
FIG. 1 shows one example of a conventional centralized wireless personal area network.
Figure 2:
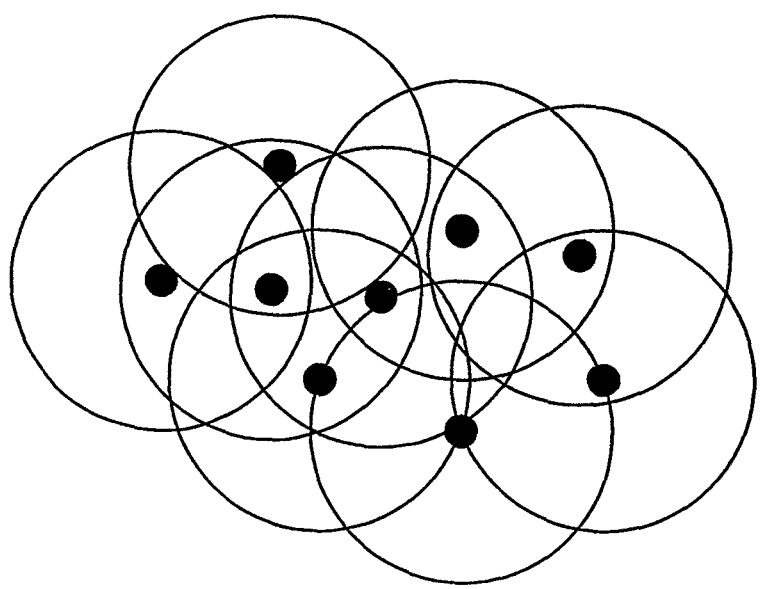
FIG. 2 shows a wireless personal area network having no centralized coordinator.
Figure 3:
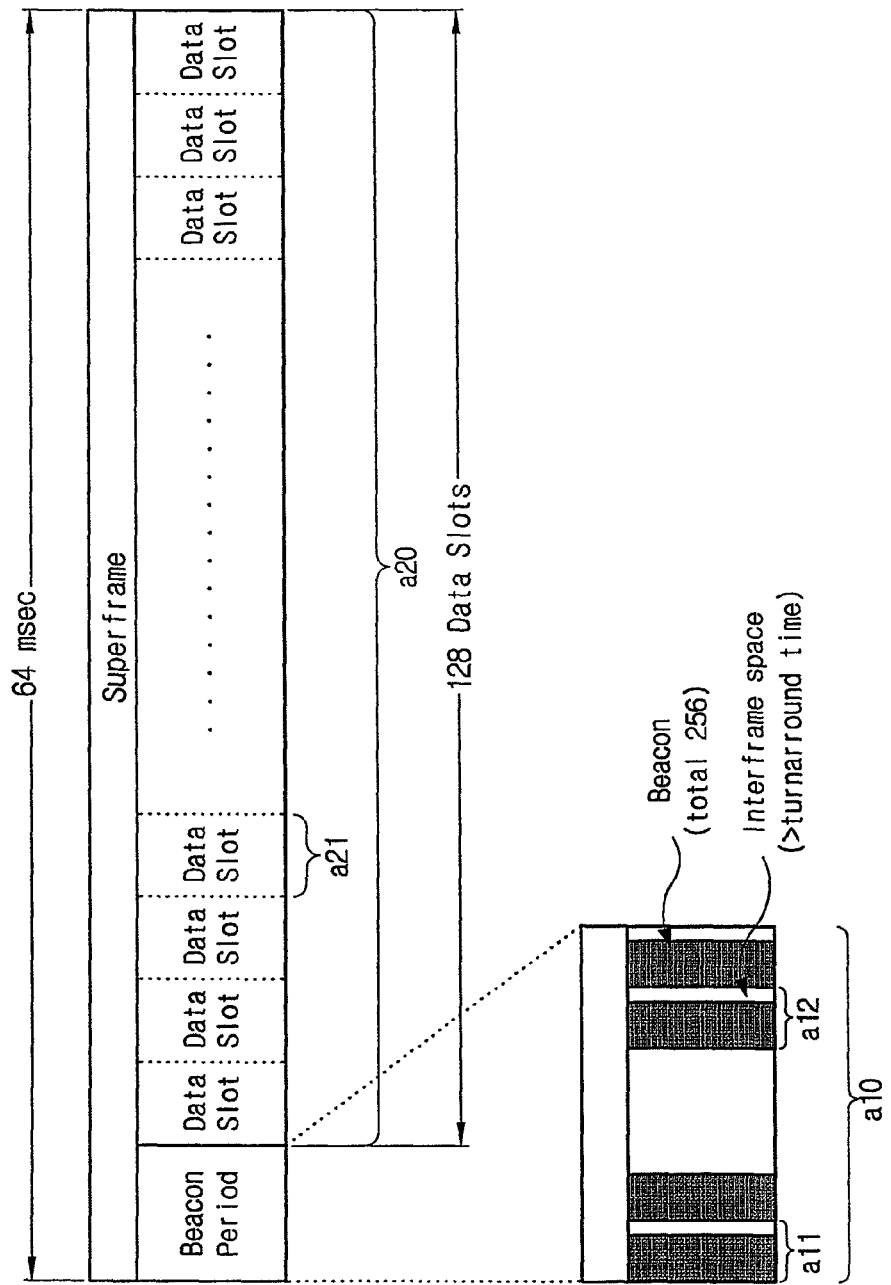
FIG. 3 shows the structure of a conventional superframe.

The present invention is described more fully hereinafter with reference to the accompanying drawings, in which embodiments of the invention are shown.

FIG. 4 illustrates a network including a channel time reservation system in a distributed wireless personal area network according to one embodiment of the invention.

The network in FIG. 4 is a distributed wireless personal area network (WPAN) that is based on a wireless mobile ad-hoc network and does not have a central coordinator.

The network of FIG. 4 is preferred to be an ultra wide band (UWB) wireless personal area network.

The network of FIG. 4 is preferred to be a distributed wireless network including at least one device.

The system of the invention includes a distributed media access control (MAC) means containing a superframe, which is constructed of a time slot. Also, the system of the invention provides a method of reserving a channel time using a slot and a method of media access control for communication between devices belonging to the network.

Referring to FIG. 4, the system of the invention includes plural devices, along with a device S and a device D. The circle around each device shows a communications range of the device and devices in that circle represents the beacon group of the device.

The device S (source device) can reserve a data slot for communication with device(s) within the beacon group, through a data slot reservation procedure according to the invention, and can transmit data in a multicast or unicast mode, in a case where the device S wants to communicate with the device D (destination device).

In order to reserve a channel time, the system of the invention transmits different information elements through the beacon. Information elements are data slot reservation indicator (DSRI), data slot request information element (DS-req IE), data slot response information element (DS-res IE), data slot acknowledge information element (DS-ACK IE), and data slot negative acknowledge information element (DS-NACK IE). Each of the above information elements are explained below and following that the operation of the whole system is described.

The system of the invention is one of media access control means within a distributed wireless personal area network, and provides a method where each device in a network can share information as to whether a data slot is free or occupied, or as to whether a data slot is allocated for communication. For this purpose, the system of the invention includes an information element frame called a "data slot reservation indicator." Using the data slot reservation indicator, the system of the invention can reserve a data slot.

The data slot reservation indicator includes status information of all data slots with respect to the possibility of reservation of a data slot, from the viewpoint of a device transmitting DSRI. In other words, the data slot reservation indicator includes a reservation status information regarding data slots of a super frame of the beacon group to which the one device belongs. Each device determines a slot to be reserved with a destination device, using DSRI. This reservation is performed through a data slot reservation procedure, which is hereinafter described.

The data slot reservation indicator may include an information indicating the data slots available for reservation by the devices of the beacon group, or an information indicating the data slots unavailable for reservation by the devices of the beacon group.

FIG. 5 shows one example of a data slot reservation indicator according to the invention.

Referring to FIG. 5, the data slot reservation indicator includes a status information of 3 bits (including b01, b02), which represents the status of a data slot. For example, in the case, where a superframe has 256 data slots, the data slot reservation indicator has a size of 96 bytes, as shown in FIG. 5. If the superframe has 128 data slots, the size of the data slot reservation indicator is reduced to 48 bytes. However, an element ID field indicating the DSRI information element's ID and a length field indicating the length of the DSRI are omitted here.

The data slot reservation indicator is contained in a beacon, which is sent to the beacon group by each device. The data slot reservation indicator includes information on all data slot, which is based on information as to occupation and communication status of data slots by devices (hereinafter, referred to as a "neighbor device") within the beacon group of a device broadcasting the data slot reservation indicator.

The following table 1 presents one example of the status information of 3 bits in a data slot reservation indicator for a single slot.

TABLE 1

| Status information | Meaning |
|---|---|
| 000 | Free slot |
| 001 | Reserved (for future use) |
| 010 | Reserved (for future use) |
| 011 | Reserved (for future use) |
| 100 | A multicast recipient is present in the neighbor. (Receiver Only in neighborhood) |
| 101 | A transmitter (unicast/multicast) or unicast recipient is present in the neighbor. |
| 110 | Receiving multicast data. (Receiver Only) |
| 111 | Operating as a transmitter, or a recipient for unicast data. |

In table 1, the status information '100' indicates that only a neighbor device currently operating as a recipient of multicast communication mode exists in the neighbor.

In the case where there are two or more neighbor devices present in beacon group, then larger value of status information is used as status information. For example, when a device transmitting a data slot reservation indicator has a transmitter in the neighbor (status information 101) and the device itself is a recipient for unicast data (status information 111); larger status information 111 can be used as a value indicating the status of the data slot.

The data slot reservation indicator is used for determining a free slot for reservation among devices.

A process for obtaining a status information corresponding to each slot (hereinafter, referred to as "calculation of a data slot reservation indicator") is periodically carried out, and also performed on beacon reception from a neighbor device. The calculation of a data slot reservation indicator constitutes an important part of the beacon frame processing in each device. Each device sends a data slot reservation indicator as part of its own beacon to thereby help updating other devices' data slot reservation indicator.

In other words, a device of the distributed wireless network generates a data slot reservation indicator for devices of the same beacon group and broadcasts the generated data slot reservation indicator.

At this time, 'all' the devices of the distributed wireless network may generate data slot reservation indicators for devices of the same beacon group and 'simultaneously' broadcast the generated data slot reservation indicator.

The device of the distributed wireless network may broadcast the data slot reservation indicator for devices of the same beacon group.

The data slot reservation indicator presents the availability status of a slot, including action that can be performed by the device in the slot.

A data slot reservation indicator may be expanded to include information for multi-channel for the purpose of spatial reuse. This is possible in the case where those rules are enabled by physical layer.

In addition, the calculation of a data slot reservation indicator may be called the 'formation of a data slot reservation indicator.' As shown in Table 1, the bit value of a data slot reservation indicator may be varied, and also the number of bits used may be varied.

The data slot reservation indicator may have status information of two bits for each slot. In this case, the status information may present an availability of a device with respect to data slot reservation of a single channel. The following table 2 shows one example of a two-bit status information.

TABLE 2

| Status information | Meaning |
| --- | --- |
| 00 | Free slot |
| 01 | Busy because of multicast Rx in a neighbor |
| 10 | Busy because of multicast Tx in a neighbor |
| 11 | Busy because of unicast Tx/Rx in a neighbor or Busy because a device is in Tx/Rx in the slot |

In addition, a data slot reservation indicator may have a one-bit status information for each slot. In this case, the status information represents the availability of device in the slot of a single channel. The following table 3 and FIG. 6 show one example of a one-bit status information and a data slot reservation indicator of that case.

TABLE 3

| Status information | Meaning |
| --- | --- |
| 0 | A slot is vacant |
| 1 | A slot is not vacant for a certain reason |

In Table 3, the status information '0' means that the slot is available (i.e., available for reservation) in a position of the device broadcasting the data slot reservation indicator and the status information '1' indicates that the slot is not available (i.e., unavailable for reservation). Those skilled in the art would appreciate that one can achieve the same objectives even when the meanings of a '0' and '1' are reversed from that written in Table 3, without deviating from the invention.

FIG. 6 shows a data slot reservation indicator including a one-bit unit reservation status information according to the invention.

The data slot reservation indicator illustrated in FIG. 6 is related to a superframe having 256 data slots, and includes 256 reservation status information of one-bit unit indicating the status of a data slot. Dissimilar to FIG. 5, FIG. 6 illustrates an 'element ID' (ID information of the data slot reservation indicator) field and a 'length' field. The 'length' field includes length information about the reservation status information of the data slots of the super frame. The ID information of the data slot reservation indicator may be 1 byte, and the length field may be 1 byte.

The data slot reservation indicator may be sent in each superframe or some superframes, voluntarily by the device or by request from some devices. In addition, it may be sent in the form of an information element through a beacon, or in other forms through other frames.

According to the invention, a data slot reservation for communication between a source device and a destination device is initiated by the source device. The source device sends a data slot request information element to the destination device through a beacon every time when a reservation is required.

Referring to FIG. 7, the data slot request information element of the invention will be described below.

The data slot request information element is used by a source device in order to initiate a reservation for a free slot(s) with destination device(s). The data slot request information element includes all information requested for reservation, such as a destination device ID, slot, priority, and a stream ID.

FIG. 7 illustrates one example of the data slot request information element according to the invention.

The data slot request information element includes a destination ID field (c01), the number of slots field (c02), the number of options field (c03), a slot number field (c04), a format field (c05), a priority field (c06), a random number field (c07), and a stream ID field (c08). Each field may be formed of at least one bit.

The destination ID field (c01) is the ID of a destination device of the reservation to be formed.

The number of slots field (c02) represents the number of slots to be requested for reservation.

The number of options field (c03) represents the number of options that a source device provides to a destination device in order to select a slot. The number of slots requested to be selected is given by the number of slots field (c02). A source device may select plural slots for reservation. A source device may provide a multiple selection such that a destination device can solve a reservation conflict in a speedy manner. For example, if the source device wants a reservation of a single slot and plural slots are determined as free slots for reservation, the number of slots to be reserved must be one (1).

The slot number field (c04) is a list of slots, which is determined by a source device as being free for reservation with a destination device. The number of slots to be listed is given by the number of options field.

The format field (c05) represents a reservation format. The following table 4 shows one example of the format field (c05).

TABLE 4

| Format | Meaning |
| --- | --- |
| 0000 | Isochronous unicast stream |
| 0001 | Asynchronous unicast stream |
| 0010 | Multicast stream |
| 0011 | Back-up |
| ... | Back-up |
| 1111 | Back-up |

Here, the values and meanings of the format field (c05) are not limited to those illustrated in Table 4. However, other types of reservations having other purposes may be performed using other types or bit values.

The priority field (c06) represents a priority order of reservation in eight steps of 0-7. A higher number indicates a higher priority. A stream having a higher priority may be preferentially selected in the case of reservation conflicts. The priority of reservation can be a QoS parameter, and can be defined by a higher layer.

The random number field (c07) is used to solve a reservation conflict, which may be caused due to a multiple reservation with the same priorities. A reservation having a higher random number has a preference.

The stream ID field (c08) is used as a sole certificate for the reservation between a source device and a destination device. In the case where multiple reservations for streams between a source device and a destination device are being simultaneously processed, the stream ID field can be used to identify a special request for reservation.

Since every device hears a beacon of all the neighbor devices present in the network, all the devices including the destination device receive a data slot request information element for a slot reservation from the source device. The data slot request information element requests a response from a destination device, which is defined by the destination ID field contained in the data slot request information element. The devices other than the destination device should also pay attention to the data slot request information element, in order to detect and solve a reservation conflict.

The data slot request information element may be sent as part of a beacon, or, for the same purpose, may be transmitted having a different name and as part of a different frame.

A data slot response information element will be described below, which is used for responding to a request for slot reservation from a source device through a data slot request information element.

The data slot response information element is used by a destination device in order to respond to a data slot request information element, which is sent by a source device for a request for reservation. The data slot response information element includes an acceptance and a rejection as the response of the destination device. In the case where the destination device accepts the request, a response including a destination device ID, slots, a priority, a stream format, or the like is required.

FIG. 8 shows one example of a data slot response information element according to the invention.

Referring to FIG. 8, a data slot response information element includes a destination ID field (d01), a response field (d02), an allowed number of slots field (d03), a slot number field (d04), a format field (d05), a priority field (d06), a random number field (d07), and a stream ID field (d08). Each field is preferred to be constituted of at least one bit.

The destination ID field (d01) is the ID of a device, which had requested the reservation.

The response field (d02) includes a response of the destination device to a source device. The following table 5 shows one example of the response field (d02).

TABLE 5

| Response value | Meaning |
| --- | --- |
| 0x00 | Accepted |
| 0x01 | Rejected, No free slot |
| 0x02 | Rejected, Conflict |
| 0x03 | Rejected, Power Save |
| 0x04 | Rejected, Going for power off |
| ... | Reserved for future use |
| 0xFF | Rejection, No reason specified |

The response values are not limited to those illustrated in Table 5, but may have a different value for representing a response of different purpose.

The allowed number of slots field (d03) represents the number of slots accepted by the destination device. The destination device may select less than the requested number of slots for various reasons. In the case where the response field (d02) has a value other than an acceptance (0x00), the allowed number of slots is zero (0) and thus the value of the allowed number of slots field (d03) is preferred to be 0x00.

The slot number field (d04) is a list of slots, which is determined by a source device as being free for reservation with the destination device. The entire number of listed slots is given by an allowed number of slots field (d03).

The format field (d05) represents a reservation format. This field must have the same value as the format field (c05) of a corresponding data slot request information element.

The priority field (d06) represents a priority order of reservation in eight steps of 0-7. A higher number indicates a higher priority. A stream having a higher priority may be preferentially selected in the case of reservation conflicts. The priority of reservation can be a QoS parameter, and can be defined by a higher layer.

The random number field (d07) is used to resolve a reservation conflict, which may be caused due to a multiple reservation with the same priorities. A reservation having a higher random number has given a preference.

The stream ID field (d08) is used as a sole certificate, which is identical to the stream ID field (c08) sent as part of a corresponding data slot request information element. In the case where multiple reservations for streams between a source device and a destination device are being simultaneously processed, the stream ID field is requested for identifying a special request for reservation.

After receiving a data slot request information element from a source device, a data slot response information element is sent as part of a beacon of a destination device in the subsequent superframe. As described above, every device hears a beacon of all the neighbor devices present in a network. Therefore, all the devices including the source device, which has sent a data slot request information element in the previous superframe, receive a response for a slot reservation.

A device, which is defined by the destination ID field (d01) contained in the data slot response information element, must respond to the data slot response information element. The other devices except for this device must pay attention to the data slot response information element for the purpose of detection and resolution of a reservation conflict.

The data slot response information element may be sent as part of a beacon, or, for the same purpose, may be transmitted having a different name and as part of a different frame.

Hereafter, a data slot acknowledge information element will be described, which is a confirmation indicator sent by a source device as a response to a data slot response information element received from a destination device.

In order to establish a three-way handshake for a slot reservation between a source device and a destination device, a confirmation indicator called a data slot acknowledge information element is used. The data slot acknowledge information element is used by a device, which sends a data slot request information element, receives a data slot response information element corresponding thereto, and acknowledges it. Therefore, a three-way handshake required for a successful slot reservation can be achieved.

The data slot acknowledge information element sent by a source device to a destination device indicates that the source device has accepted the reservation and data transmission can be started. A data slot acknowledge information element is sent, only when a source device is satisfied with a reservation in response from the destination device. Furthermore, if the source device, the initiator of the reservation, is not satisfied with the reservation response sent by the destination device, an acknowledgement to the data slot response information element is not sent.

FIG. 9 shows one example of a data slot acknowledge information element according to the invention.

Referring to FIG. 9, a data slot acknowledge information element includes a destination ID field (e01), a format field (e02), and a stream-ID field (e03).

The destination ID field (e01) constitutes a field for indicating the ID of a device to which the acknowledgement is directed.

The format field (e02) is a field for defining a reservation format.

The stream ID field (e03) is a field for defining a sole authenticator, which is identical to the stream ID field (c08) sent as part of a data slot request information element that has generated this response. This is required in order to identify a particular reservation request, in the case where plural reservations for streams are performed simultaneously between a source device and a destination device.

A slot reservation by a source device is completed by transmitting a data slot acknowledge information element in a superframe subsequent to a superframe through which a data slot response information element has been received. Then, the source device prepares for transmitting data in the reserved slots, which starts from the superframe where the data slot acknowledge information element is sent.

After source device has received a data slot response information element from destination device, a data slot acknowledge information element is sent as part of a beacon of a source device in a subsequent superframe. As described above, each device hears a beacon of all the neighbor devices present in a network. Therefore, all the devices including the device, which has sent a data slot response information element in the previous superframe, receive an acknowledge for a slot reservation. The destination device, which is defined in the destination ID field (e01) of the data slot acknowledge information element, must prepare for reception of data in the acknowledged slot. Devices other than the destination device must pay attention to the data slot acknowledge information element for the purpose of detection and resolution of a reservation conflict.

The data slot acknowledge information element may be sent as part of a beacon, or, for the same purpose, may be transmitted having a different name and as part of a different frame.

Hereafter, a data slot negative acknowledge information element will be explained, which means a cancellation of reservation procedures.

In order to indicate a cancellation or termination of a slot reservation between a source device and a destination device, a data slot negative acknowledge information element can be used by either one of the two device. During a reservation procedure, a data slot negative acknowledge information element sent by a device means a cancellation of reservation of the indicated reservation for some reason. The reason may be unavailability of reservation due to reservation conflict or some other device specific reason.

In addition, after a successful reservation, a data slot negative acknowledge information element sent from a device means an intention to terminate the stream. In general, termination is initiated by a source device. No acknowledgement is required for a data slot negative acknowledge information element, it results in termination of the reservation.

If a data slot negative acknowledge information element appears during a reservation procedure, it means that the reservation being processed is cancelled. After a reservation is successfully performed and while a communication is carried out, a data slot negative acknowledge information element means a formal termination of stream.

FIG. 10 shows one example of a data slot negative acknowledge information element according to the invention. Referring to FIG. 10, a data slot negative acknowledge information element includes a destination ID field (f01), a stream ID field (f02), and a format field (f03).

The destination ID field (f01) represents the ID of a device, to which a negative acknowledgement is directed, and the stream ID field (f02) is a sole authenticator for indicating which stream or reservation is to be terminated. The format field (f03) represents a reservation format.

The data slot negative acknowledge information element plays an important role in resolving a conflict. The data slot negative acknowledge information element is transmitted by an affected device as part of a beacon. All the devices, including a device defined in the destination ID field (f01), hear the beacons of neighbor devices in the network, and receive a data slot negative acknowledge information element for the reservation. A device defined in the destination ID field (f01), which is one field of a data slot negative acknowledge information element, is requested to cancel the reservation, or to terminate the stream defined in the stream ID field (f02). All other devices except for that device may simply ignore the data slot negative acknowledge information element.

The data slot negative acknowledge information element may be sent as part of a beacon, or, for the same purpose, may be transmitted having a different name and as part of a different frame.

The types of information sent and received through the beacon of each device are explained above. Prior to transmit data within a network, a data slot reservation performed among devices is constituted of a process for exchanging this information.

A method of data slot reservation according to the invention is hereafter explained. The method of data slot reservation includes a calculation of a data slot reservation indicator and a slot reservation process. The slot reservation process includes a determination of free slot and a reservation process.

Figure 11:
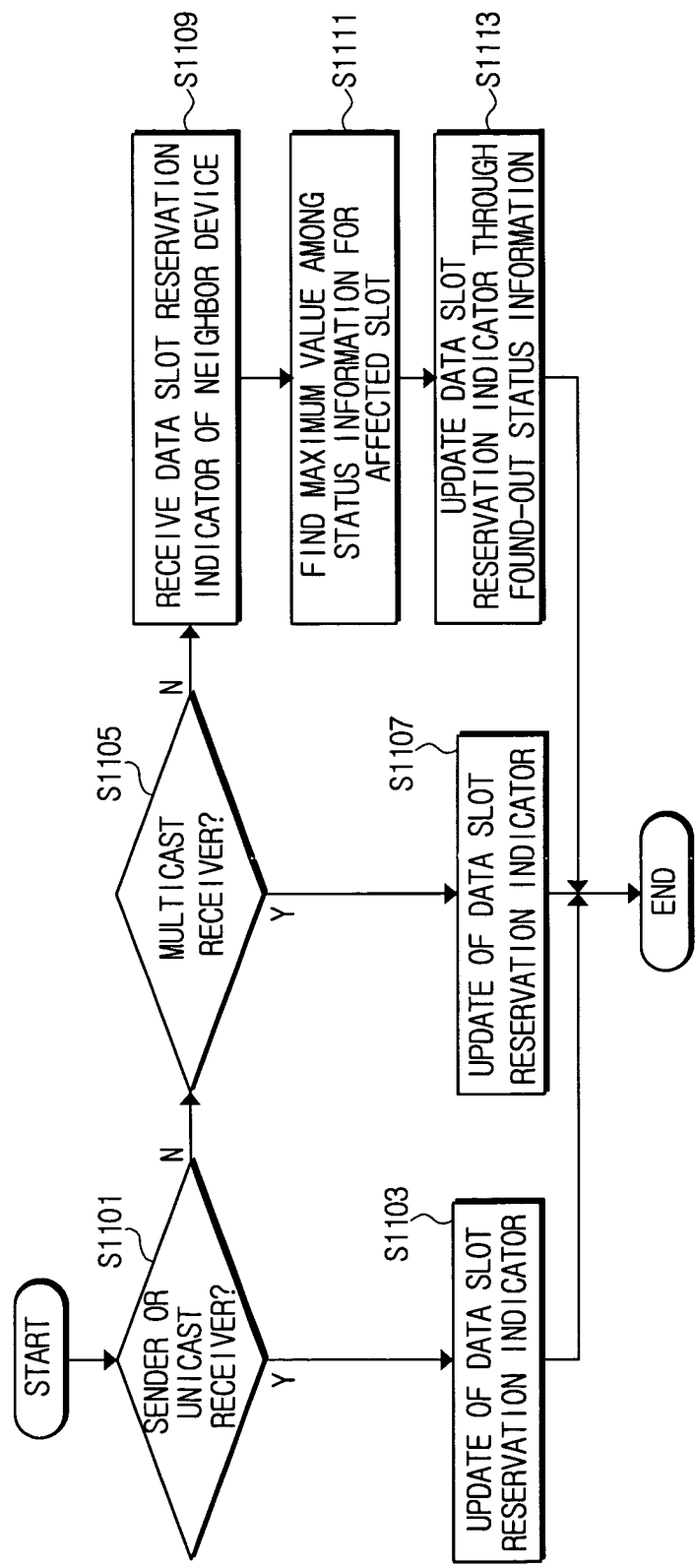
FIG. 11 is a flow chart showing a method of calculating and updating a data slot reservation indicator according to the invention.

FIG. 11 is a flow chart showing a method of calculating and updating a data slot reservation indicator according to the invention.

All the devices include a data slot reservation indicator in their beacons. Each device updates its own data slot reservation indicator, based on its own status during a data slot and also using the data slot reservation indicator of a neighbor device.

Regardless of whether or not a device is interested in a data slot reservation, the device is required to update its own data slot reservation indicator and broadcast the updated data slot reservation indicator in its own beacon.

A data slot reservation indicator includes the status of all the data slots of a superframe from the device's own point of view. So, the status of the device in the slot is recorded in the status information (triplet) in a data slot reservation indicator. If the device does not communicate during the slot, then its neighbor device(s)' status is (are) recorded as status information. If the neighbor device(s) is (are) also silent during the slot, then the value of status information becomes '000.' The calculation procedure of a data slot reservation indicator is explained below.

The status information for each slot can have one of the values listed in Table 1.

In order to calculate the status information of a data slot reservation indicator for a slot, a device determines if it is a source of unicast or multicast, or a receiver of a unicast stream (S1101). If so, the device indicates status as '111' according to Table 1 (S1103).

If the device itself is not a unicast or multicast transmitter and a unicast receiver, it determines if it is a multicast receiver in the slot×(S1105). If so, the device indicates status as '110' according to Table 1 (S1107).

As the result of the determination in step S1105, if the device is not a source or a receiver, it receives a data slot reservation indicator from neighbor device(s). It uses those data slot reservation indicators in order to update its own data slot reservation indicator (S1109).

After understanding all the information corresponding to a slot from the data slot reservation indicator of all neighbor devices, the status information having a maximum value is selected for the slot, which is found out from all neighbor devices (S1111).

Using the above selected status information, from the neighbor device, a status information of the data slot reservation indicator for the slot is obtained from mapping table (Table 6), from the device's point of view and updated (S1113).

The mapped status information value is recorded in the data slot reservation indicator of this device for the slot. The following table 6 shows one example of a desired mapping table.

TABLE 6

| Status information received from neighbor device | Mapped status information |
| --- | --- |
| 000 | 000 |
| 100 | 000 |
| 101 | 000 |
| 110 | 100 |
| 111 | 101 |

That is, in the case where the neighbor device is not a transmitter or receiver (status 000, 100 or 101), the affected device corresponds to the case where there is no sender or receiver in the neighbor and thus is mapped into '000.'

Through the above described processes, calculation and updating of a data slot reservation indicator by each device in a network are carried out. The data slot reservation indicator should be calculated and updated every time that a new data slot reservation indicator is received.

Hereafter, data slot reservation procedures based on the updated data slot reservation indicator according to the invention will be explained, with reference to FIGS. 4 and 12.

Referring to FIG. 4, device S (hereinafter, referred to as a 'source device S') wants to reserve slots in order to communicate with the device D (hereinafter, referred to as a 'destination device D').

Data slot reservation procedures may vary with the types of stream, i.e. multicast stream and unicast stream.

Two multicast streams share a two-hop region neighborhood in the same slot(s), and exist without interference with each other. It is because the multicast stream in a single slot is perfectly unidirectional and an acknowledgement for the data is not required.

In contrast, two unicast streams cannot exist in a two-hop region neighborhood in the same slot(s) because of interference by a transmitter or a receiver. Because the transmitter requests a normal acknowledgement from a receiver, and the acknowledgement is also broadcasted, there can again be interference with other unicast streams present in the two-hop region neighborhood. This is because of the bi-directionality of the unicast stream.

The first step of a data slot reservation is to determine a free slot, which is common in both devices (hereinafter, referred to as a 'common free slot') such that a source device S can transmit and a destination device D can receive.

Figure 12:
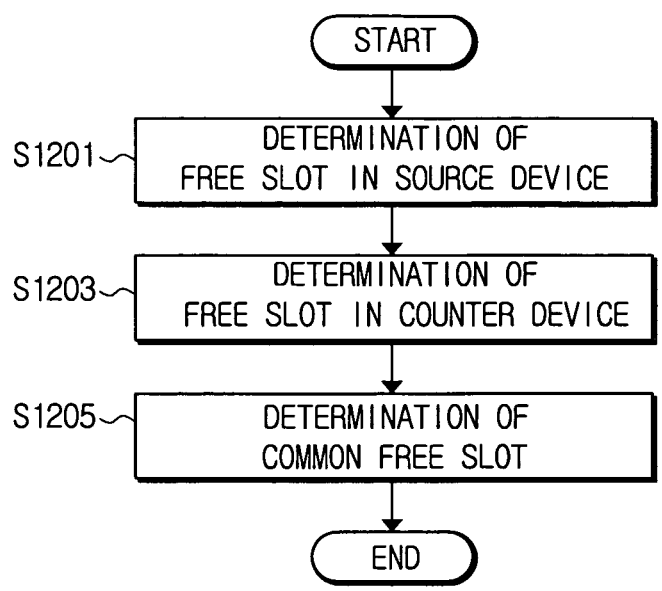
FIG. 12 is a flow chart explaining a method of determining a free slot according to the invention.

FIG. 12 is a flow chart explaining a method of determining a free slot according to the invention.

Since a slot reservation procedure is initiated by the source device, the method of the free slot determination describes a procedure for the source device.

The source device S first is to determine a free slot in order to transmit to the destination device D in a data section. So, slot(s) having a status information value '000' will be free such that the source device can transmit (S1201).

Next, the source device S is to determine a free slot, in which the destination device D can receive. This is controlled differently, due to a different nature of acknowledgement policies of multicast and unicast streams.

If the source device S is interested in an initiation of a multicast stream, it selects slot(s) having the status information '000' or '100' in the data slot reservation indicator of the destination device D. If the source device S is interested in an initiation of a unicast stream, it selects a slot having the status information '000' in the data slot reservation indicator of the destination device D (S1203).

Then, a common free slot(s) is determined as the slot selected in the above steps S1201 and S1203, i.e., a slot free with respect to both the source device S and the destination device D. This common free slot can be used for a reservation between the source device S and the destination device D (S1205).

In the case where a common free slot is not found, the source device S and the destination device D have no slot for a reservation. In this case, the source device S should wait for a certain period of time before retry for reservation.

After deciding a common free slot according to the above mentioned procedures, the source device S initiates the data slot reservation procedure with the destination device D, which is described hereafter.

The slots in the data section of a superframe can be reserved for an isochronous or asynchronous stream by means of a request, response and acknowledgement, which is based on a three-way handshake. If the source device S has received a data slot response information element of acceptance from the destination device D in response to a data slot request information element then, those slots are considered to be reserved by the source device S and the destination device D, and their data slot reservation information elements are updated.

Figure 13:
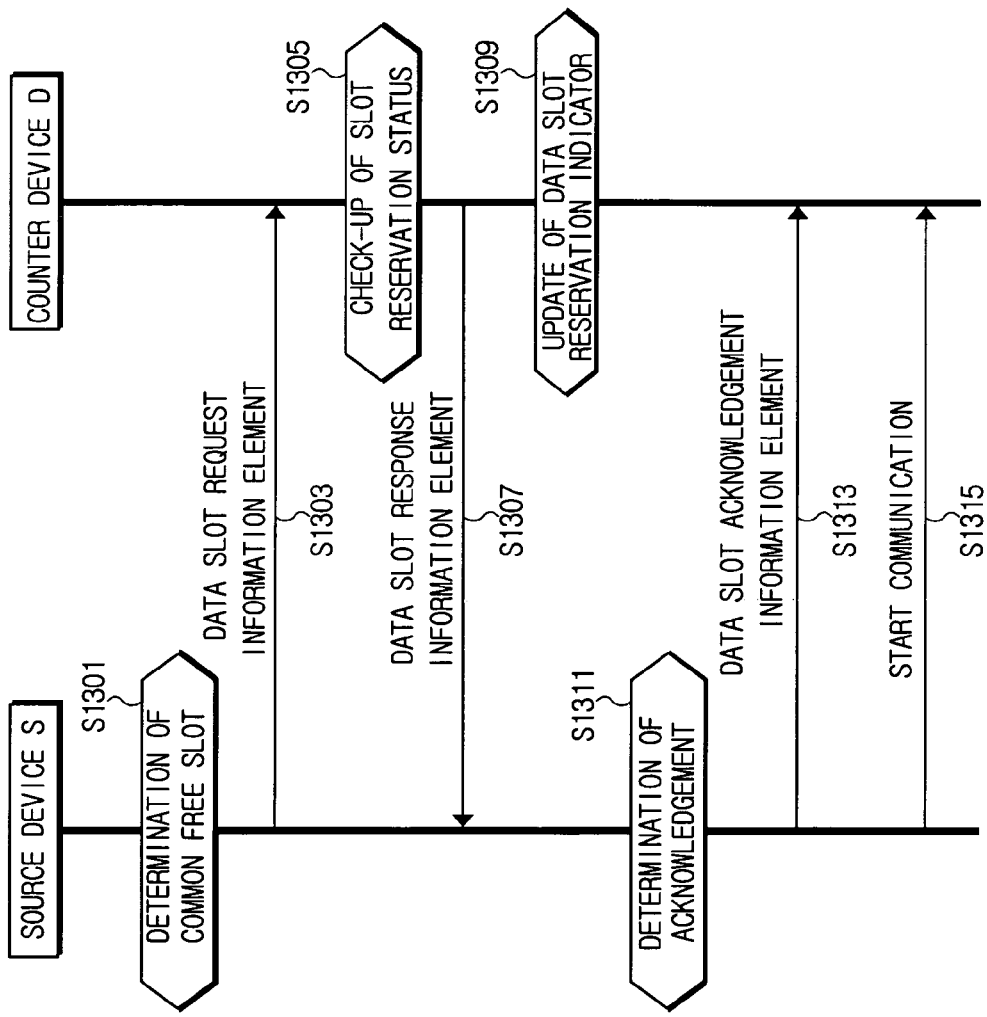
FIG. 13 is a message sequence chart explaining a data slot reservation method according to the invention.

FIG. 13 is a flow chart that explains a data slot reservation method according to the invention.

The data slot reservation procedure is configured such that a common free slot between a pair of devices can be reserved for the purpose of communication.

Once a common free slot is decided through the free slot determination procedure (S1301), the source device S includes data slot request informnation element in the beacon thereof (S1303).

In the case where at least one selectable slot is provided as part of a reservation request, the destination device D checks to see if the slot is reserved for another device (S1305).

If it is found that a neighbor device has not performed any data slot reservation procedure for the same slot, the destination device D accepts the request. If not, the destination device D may select other slot(s) among plural options offered by the source device. If any slot could not be selected, the destination device rejects the request. An appropriate response (acceptance or rejection) is sent as a data slot response information element of the beacon of the destination device (S1307).

The destination device D updates its own data slot reservation indicator, when it has transmitted an acceptance in the data slot response information element. So, the selected slot (s) is reserved and marked as unavailable according to its stream type (Refer to Table 1) in its own data slot reservation indicator, so that other pair of devices cannot reserve the same slot(s) (S1309).

When the source device S receives an acceptance response from the destination device D through a data slot response information element, it decides on sending acknowledgement for the reservation. If the source device S determines to send an acknowledgement, the data slot reservation indicator is updated (S1311).

If the source device S sends an acknowledgement in response to the acceptance response of the destination device D by sending a data slot acknowledgement information element in the subsequent superframe (S1313), the source device S can start sending data in the reserved slot.

Therefore, if the destination device D has received a data slot acknowledgement information element from the source device S, the destination device D waits for data to be received in the reserved slot through the reserved channel. This is the case when there are no conflicts of the reservation found either for the source or destination devices, and successful communication is performed on the reservation. Accordingly, a data slot reservation procedure is completed (S1315).

Through the above described processes data slot reservation for communication can be performed. However, for various reasons, the reservation can be cancelled, and in this case the source device S or the destination device D may send a data slot negative acknowledge information element. A reservation conflict is detected and resolved through those processes.

Hereafter, a method of detecting and resolving a reservation conflict in the system of the invention is explained.

If a destination device D hears multiple requests for a reservation from different devices, which have at least one request towards the destination device D, the destination device D compares all requests, based on the higher priority, and then comparison is carried out based on the higher random number. If a request from a source device S wins in this comparison, the destination device D accepts the reservation request of the source device S. Otherwise, the reservation request from the source device S will be rejected. In addition, instead of rejection, if the source device S provides multiple options for slots, the destination device D may accept the request for other slot(s), which has won in the comparison and no reservation in other pairs of devices.

If the destination device D hears a data slot response information element from at least one of the neighbor device, together with a data slot request information element from the source device S for same slot(s) or reservation, the destination device D cannot accept the reservation request for the slot. This rule enables a 'first-start-first-reserve' principle with respect to reservations for a same slot. If a source device S offers plural options, the destination device D is free to accept a reservation request for other slot.

Figure 14:
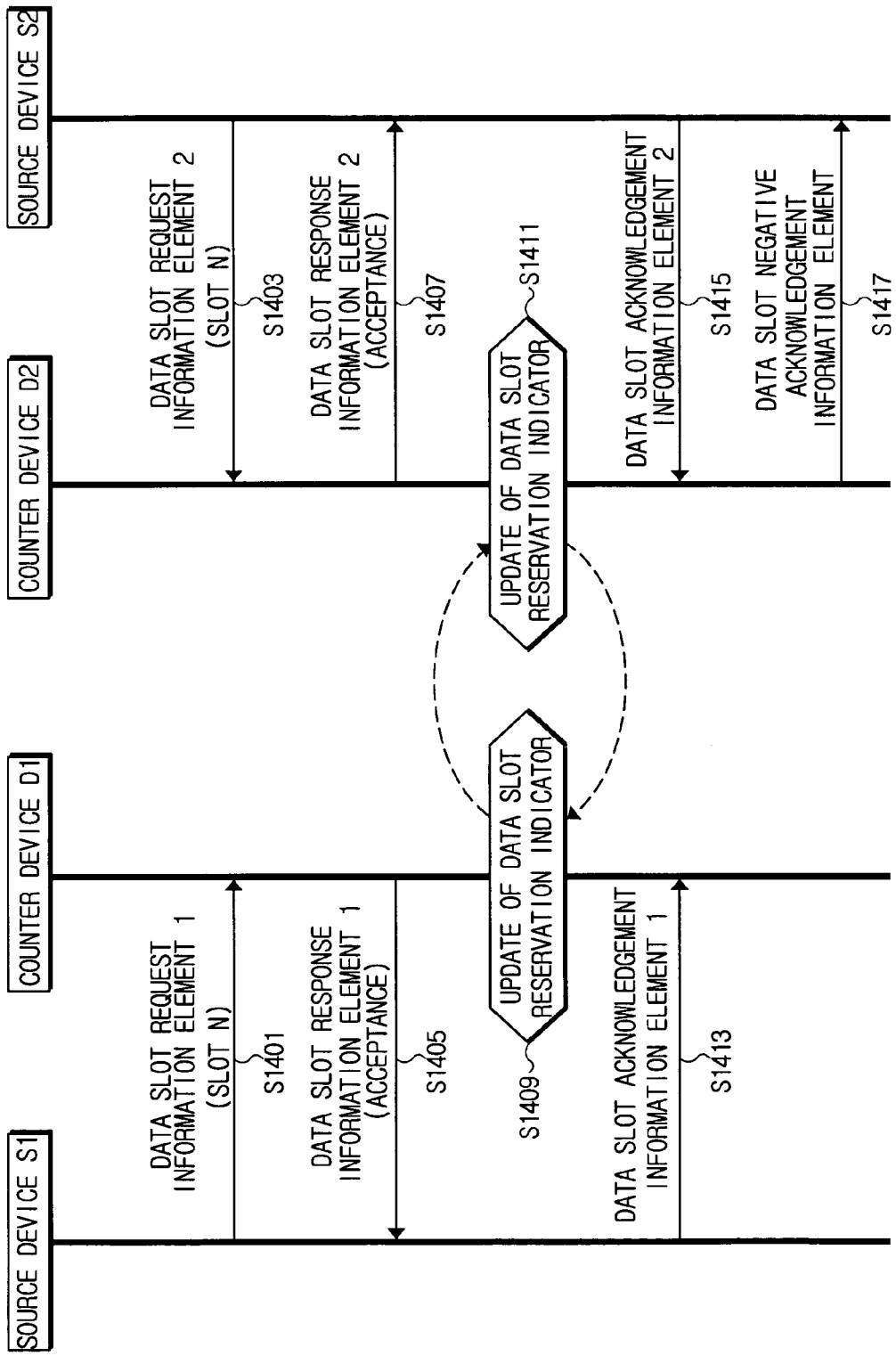
FIG. 14 is a message sequence chart explaining a scenario of generation of data slot negative acknowledge information element according to one embodiment of the invention.

FIG. 14 is a message sequence chart showing creation of a data slot negative acknowledge information element according to one embodiment of the invention.

It is assumed that a source device S1 tries to reserve a slot n with a destination device D1 and a source device S2 attempts to reserve the same slot n with a destination device D2.

The source device S1 sends data slot request information element 1 to the destination device D1 for the slot n (S1401). Similarly, the source device S2 sends data slot request information element 2 to the destination device D2 for the slot n. Here, the data slot request information element 1 has a higher priority, as compared with the data slot request information element 2 (S1403).

The destination device D1 and D2 can send a data slot response information element 1 and 2 respectively. No reservation conflict situation is identified between them (S1405, S1407).

The destination device D1 marks the reservation of the slot n in its own data slot reservation indicator (S1409), and also the destination device D2 marks the reservation of the slot n in its own data slot reservation indicator. The respective data slot reservation indicators are advertised through their own beacon (S1411).

The source devices S1 and S2 receive a data slot response information element 1, 2 respectively from the destination devices D1 and D2, and then send data slot acknowledge information element 1, 2 to the destination devices D1 and D2 (S1413, S1415). However, the destination device D2 recognizes the reservation processing of the slot n through the data slot reservation indicator received from the destination device D1, and also recognizes that the priority is higher than its own reservation and thus a reservation can not be continued. The destination device D2 cancels the reservation by sending a data slot negative acknowledge information element to the source device S2 (S1417).

Figure 15:
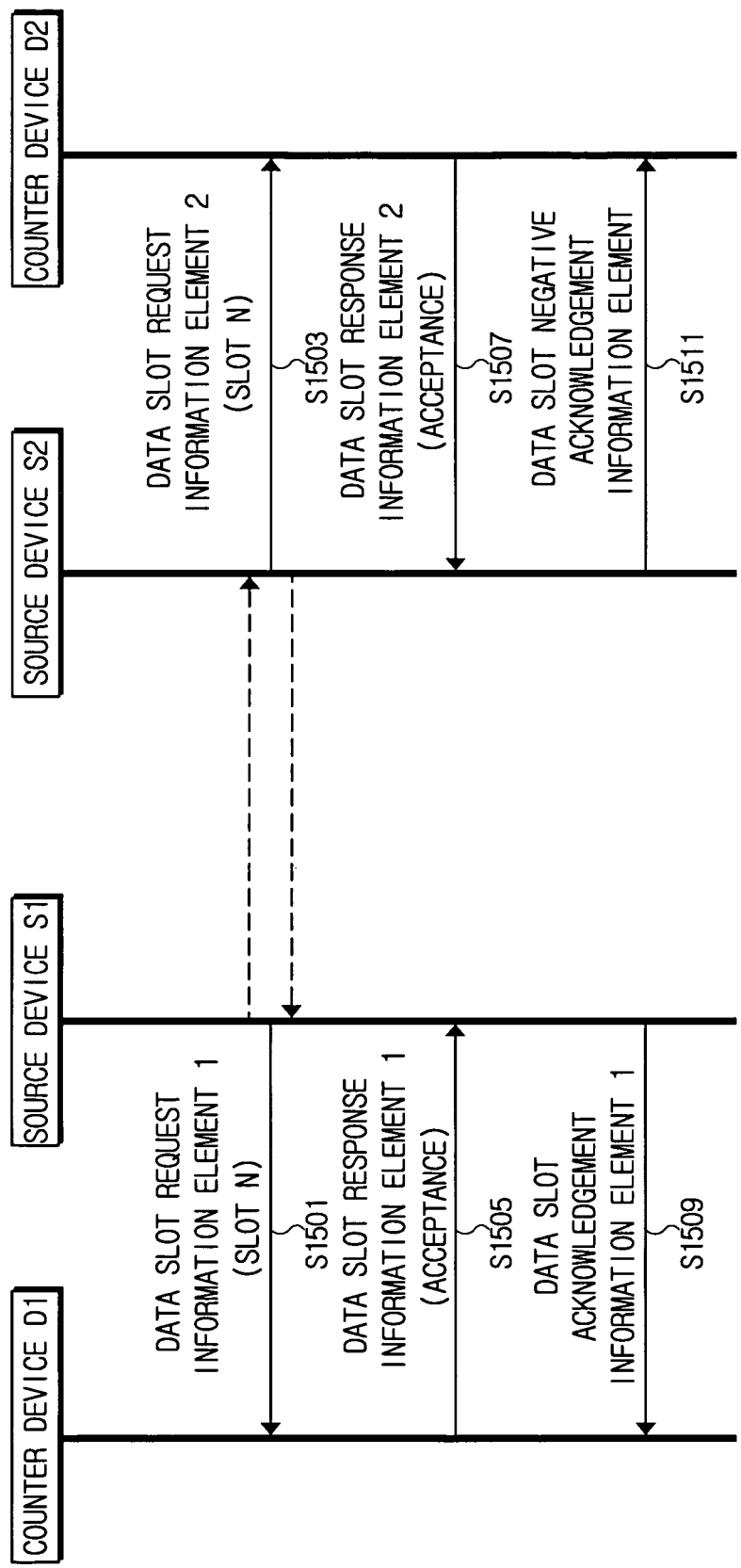
FIG. 15 is a message sequence chart explaining a scenario of generation of data slot negative acknowledge information element according to another embodiment of the invention.

FIG. 15 is a message sequence chart showing creation of a data slot negative acknowledge information element according to another embodiment of the invention.

Similar to FIG. 14, it is assumed that a source device S1 tries to reserve a slot n with a destination device D1 and a source device S2 attempts to reserve the same slot n with a destination device D2.

The source device S1 sends data slot request information element 1 to the destination device D1 for the slot n. This data slot request information element 1 can be heard by the source device S2 present in the same beacon group as the source device S1 (S1501).

Similarly, the source device S2 sends data slot request information element 2 to the destination device D2 for the slot n. Here, the source device S1 can hear the data slot request information element 2. However, the data slot request information element 1 has a higher priority, as compared with the data slot request information element 2 (S1503).

The destination device D1 and D2 can send a data slot response information element 1 and 2 respectively. Any reservation conflict could not be identified by destination devices (S1505, S1507).

The source device S1 compares the data slot request information element 1 with the data slot request information element 2 received from the source device S2. Since the data slot request information element 1 has a higher priority, the source device S1 can send a data slot acknowledge information element after receiving a data slot response information element 1 from the destination device D1 (S1509).

The source device S2 compares the data slot request information element 2 with the data slot request information element 1 received from the source device S1. However, the data slot request information element 1 has a higher priority. Thus, even if the source device S2 receives a data slot response information element 2 from the destination device D2, it cannot send a data slot acknowledge information element, but must send a data slot negative acknowledgement information element (S1511).

In this way, the reservation conflict between the source device S1 and the source device S2 can be resolved.

The methods as described above enable a data slot reservation among devices in a distributed wireless personal area network. In addition, they can detect and resolve a reservation conflict, which may occur during the reservation process.

Furthermore, the reservation conflict resolution may occur during the reservation process and then a new data slot reservation can be carried out in a speedy manner. Since options for plural slots are offered for reservation, the reservation can be more rapidly processed. Therefore, the efficiency of the whole system can be enhanced and the energy consumption can be reduced, thereby extending the service life of the device.

The present invention can be embodied into a method, a device or a system. In addition, in the case where the present invention is embodied into a computer software, the constitutional elements of the invention can be replaced by code segments required for executing required actions. The program or the code segments can be stored in a media, which can be processed by a microprocessor, and also can be transmitted through a transmission media or a communication network as a computer data combined with carrier waves.

A media, which can be processed by a microprocessor, includes an electronic circuit, a semiconductor memory element, a ROM, a flash memory, an EEPROM, a floppy disk, an optical disk, a hard disk, an optical fiber, a wireless network, or the like, which can transmit and store information. The computer data includes data, which can be transmitted through an electrical network channel, an optical fiber, an electromagnetic field, a wireless network, and the like.

As described above, according to the present invention, in a data slot reservation for data transmission in a distributed wireless personal area network, all the devices within the wireless personal area network can make a channel time reservation with a data slot required for their communication, in a completely distributed manner without help from or support of a central coordinator device.

In addition, beyond detection of an already-occurred reservation conflict, the invention can detect and solve a potential reservation conflict, which may occur during the reservation process of data slot(s).

For this purpose, the system of the invention can determine a free slot, which is common in both a source device and a destination device. This decision procedure can be varied, depending on whether the device of the system tries a multicast communication or attempts a unicast communication.

In addition, a data slot reservation for communication among devices can be completed within a shorter period of time, by means of the method of solving a reservation conflict according to the invention. Therefore, the efficiency of the whole system can be enhanced and the energy consumption can be reduced, thereby extending the service life of the device.

Furthermore, the present invention establishes a reservation priority for various types of data traffic, thereby improving the QoS (quality of service) of a network.

In addition, the present invention provides a method of spatially re-using the channel time, when multiple reservations are simultaneously formed in a spatial region having the same physical media, without any interference.

The foregoing embodiment and advantages are merely exemplary and are not to be construed as limiting the present invention. The present concept can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of media access controlling in a distributed wireless network comprising at least one device, the method comprising:
    all devices of the distributed wireless network, generating a data slot reservation indicator of devices of a same beacon group; and
    the all devices, broadcasting the generated data slot reservation indicator simultaneously.

2. The method as claimed in claim 1, wherein the data slot reservation indicator comprises a reservation status information regarding data slots of a super frame of the beacon group to which the at least one device belongs.

3. The method as claimed in claim 2, wherein the super frame comprises 256 data slots, and the reservation status information indicates whether the 256 data slots are available for reservation or not.

4. The method as claimed in claim 2, wherein the reservation status information of one data slot is expressed using one bit,
    the reservation status information for the data slots available for reservation by the devices of the beacon group is expressed as '1', and
    the reservation status information for the data slots unavailable for reservation by the devices of the beacon group is expressed as '0'.

5. The method as claimed in claim 2, wherein the data slot reservation indicator further comprises an ID information of the data slot reservation indicator, and a length information about the reservation status information of the data slots of the super frame.

6. The method as claimed in claim 5, wherein the data slot reservation indicator comprises 1 byte of the ID information, and 1 byte of the length information.

7. The method as claimed in claim 2, wherein the data slots of the super frame are media access slots.

8. The method as claimed in claim 2, wherein the data slot reservation indicator comprises one reservation data slot for each data slot of the super frame.

9. The method as claimed in claim 1, wherein the data slot reservation indicator comprises an information indicating the data slots available for reservation by the devices of the beacon group.

10. The method as claimed in claim 1, wherein the data slot reservation indicator comprises an information indicating the data slots unavailable for reservation by the devices of the beacon group.

11. The method as claimed in claim 1, wherein the distributed wireless network topology is implemented in an ultrawide band ad-hoc wireless personal area network.

12. The method as claimed in claim 1, wherein the data slot reservation indicator represents an availability of data slots for reservation to exchange data.

13. The method as claimed in claim 1, wherein the data slot reservation indicator is updated by a device of the same beacon group, when the broadcast data slot reservation indicator is received by the device of the same beacon group.

14. The method as claimed in claim 1, wherein the data slot reservation indicator indicates a status information of each data slot, using at least one bit.

15. The method as claimed in claim 1, wherein the data slot reservation indicator comprises information on all data slots, which is based on information as to occupation and communication status of data slots by devices within the same beacon group.

16. The method as claimed in claim 1, wherein the data slot reservation indicator is used for determining a free slot for reservation among the at least one device of the distributed wireless network.

17. The method as claimed in claim 1, wherein reservations of data slots in the distributed wireless network are performed in a completely distributed manner.

* * * * *